United States Patent
Gupta et al.

(10) Patent No.: US 10,885,415 B2
(45) Date of Patent: Jan. 5, 2021

(54) ANTI-COUNTERFEITING MARK WITH 3-D FEATURES

(71) Applicant: Transpacks Technologies Private Limited, Lucknow (IN)

(72) Inventors: Deepak Gupta, Lucknow (IN); Ankit Nagar, Chennai (IN)

(73) Assignee: TRANSPACKS TECHNOLOGIES PRIVATE LIMITED, Lucknow (IN)

( * ) Notice: Subject to any disclaimer, the term of this patent is extended or adjusted under 35 U.S.C. 154(b) by 0 days.

(21) Appl. No.: 16/125,067

(22) Filed: Sep. 7, 2018

(65) Prior Publication Data

US 2020/0082235 A1    Mar. 12, 2020

(51) Int. Cl.
G06K 19/06      (2006.01)
G06K 19/08      (2006.01)
G09F 3/00       (2006.01)

(52) U.S. Cl.
CPC . *G06K 19/06159* (2013.01); *G06K 19/06037* (2013.01); *G06K 19/086* (2013.01); *G09F 3/0297* (2013.01)

(58) Field of Classification Search
CPC ....... G06K 19/06159; G06K 19/06037; G06K 19/086; G09F 3/0297
See application file for complete search history.

(56) References Cited

U.S. PATENT DOCUMENTS

| | | | |
|---|---|---|---|
| 7,878,398 B2 | 2/2011 | Chen et al. | |
| 8,180,174 B2 | 5/2012 | Di Venuto et al. | |
| 8,856,533 B2 * | 10/2014 | Schrijen | G06F 21/86 380/44 |
| 9,082,062 B2 | 7/2015 | Sharma et al. | |
| 9,208,394 B2 | 12/2015 | Di Venuto Dayer et al. | |
| 9,898,695 B2 * | 2/2018 | Suwald | G06F 21/34 |
| 10,002,362 B1 * | 6/2018 | Endress | G09C 1/00 |
| 10,133,923 B2 * | 11/2018 | Varone | G06K 9/00577 |
| 2007/0278305 A1 | 12/2007 | Komaki | |

(Continued)

FOREIGN PATENT DOCUMENTS

| | | |
|---|---|---|
| EP | 2024899 | 4/2015 |
| EP | 2911335 | 8/2015 |

(Continued)

OTHER PUBLICATIONS

Maes ("Physically Unclonable Functions: Constructions, Properties and Applications", Aug. 2012).*

(Continued)

*Primary Examiner* — Seung H Lee
(74) *Attorney, Agent, or Firm* — Stephen E. Zweig (57) ABSTRACT

Disclosed herein is an authenticating mark formed on the surface of a product or package. The said mark comprising: at least an overt portion of visible 3D random image in the form of physically unclonable function (PUF) characterized in that the said PUF is random cracks or colors. Additionally, phosphor particles might be added to this pattern as covert features. It further disclose a system and method for identifying genuine or counterfeited products by analyzing the image of a 3D-PUF and its encrypted image using a commonly held scanning device.

20 Claims, 6 Drawing Sheets
(4 of 6 Drawing Sheet(s) Filed in Color)

(56) References Cited

U.S. PATENT DOCUMENTS

2014/0014715 A1 1/2014 Moran et al.
2019/0095668 A1* 3/2019 Gaathon .............. G07D 7/2033

FOREIGN PATENT DOCUMENTS

IN 201611015765 11/2017
WO WO2015077471 5/2015

OTHER PUBLICATIONS

Chong et. al (C. N. Chong, D. Jiang, J. Zhang, L. Guo, "Anti-counterfeiting with a Random Pattern", IEEE Second International Conference on Emerging Security Information, Systems and Technologies, 2008. pp. 146-153.
Examination Report for Indian Patent Application No. 201611015765, dated Oct. 29, 2019, 6 pages.
Deutschmann et al, "A PUF Based Hardware Authentication Scheme for Embedded Devices," Technical report, Technikon Forschungs—und Planungsgesellschaft mbH, Burgplatz 3a, 9500 Villach, Austria, Aug. 2018, 18 pages.
Martin Deutschmann et al, "Research on the Applications of Physically Unclonable Functions within the Internet of Things," Technikon Forschungs—und Planungsgesellschaft mbH, Burgplatz 3a, 9500 Villach, Austria, Aug. 2018, 9 pages.
Office Action issued for Indian Patent Application No. 201911025190, dated Aug. 28, 2020, 5 pages.

* cited by examiner

ANTI-COUNTERFEITING MARK WITH 3-D FEATURES

TECHNICAL FIELD OF THE INVENTION

Embodiments of the present invention relates to a mark/label for identifying genuine or counterfeited goods and more particularly, to an authenticating mark/label of a visual pattern of a random distribution of multiple, multicolored, three-dimensional elements hereinafter referred to as "PUF (physically unclonable function)". Embodiments further relate to a method and a system for identifying genuine or counterfeited products by verifying the image of a 3D-PUF against its encrypted image using a commonly held scanning device.

BACKGROUND OF THE INVENTION

Counterfeiting is a continuously increasing problem as counterfeits of books, CDs, electronic equipment, or consumer durables, are available which impacts the business conditions in the country. Fake products in foods and pharmaceutical industry create an additional alarming health risk. So manufacturer, producer and even users need a high level of security to protect their products. According to OECD (Organization for Economic Cooperation and Development) report (Magnitude of counterfeiting and piracy of tangible products: an update, OECD, November 2009, http://www.oecd.org/sti/ind/44088872.pdf), "the share of counterfeit and pirated goods in world trade is also estimated to have increased from 1.85% in 2000 to 1.95% in 2007," with current levels expected to exceed 5%. Further, in many cases, it is very difficult to distinguish counterfeit goods from genuine products.

Number of anti-counterfeiting strategies are being studied that can be broadly classified as: Overt Technologies, Covert Technologies, Forensic Technologies and Track-and-Trace Technologies. Overt Technologies use visible features like color-shifting inks, holograms etc. Covert Technologies use hidden features which are identifiable by specialized detectors. For example, invisible printing, digital watermarks, crystal taggants etc. Forensic Technologies also use hidden features which are identifiable under special environment or testing methods. These include chemical and biological tags, DNA taggants, microtaggants etc. In Track-and-Trace Technologies, each packaged stock is assigned an identity that stores product's details like expiry date, tracing history of the packages and useful product information. These include RFID Tags, 1-D and 2-D Bar Codes etc.

However, these conventional technologies suffer from varied drawbacks. Overt and covert technologies are easy to replicate. Forensic Technologies, which are a subset of covert technologies are costly and requires special environment for detection. Track-and-Trace Technologies are costly (specially RFID tags), prone to hacking, and their implementation is difficult across various markets. Combination of these technologies are also being developed.

In prior art documents, EP2911335 discloses a device and method for identifying genuine and counterfeited goods using challenge-response pairs (CRP) based on physical unclonable function (PUF). But, this technology requires a special device to emit first electromagnetic signals by execution of programmed PUF algorithms to generate a challenge to the good for obtaining a response, such that the resulting CRP verifies the authenticity.

In prior art documents, U.S. Pat. No. 9,082,062 discloses a method of, and a system and a label for, authenticating an object in situ by creating an authentication pattern signature for the object to be authenticated, associating a random distribution of multiple, three-dimensional colored elements with the object, aiming a portable, handheld, image capture device at the object to capture return light from the elements as a single image, verifying from the single image that the elements are three-dimensional, processing the single image to generate an image pattern of the elements, comparing the image pattern with the authentication pattern signature, and indicate that the object is authentic when the image pattern matches the authentication pattern signature. But this technology creates randomly distributed 3D colored elements on the label beforehand and then applies the label on the object, such that label can be removed from the authentic object and applied to a fake counterpart of it. Also, pattern signature is remotely stored and address for authentication is obtained through a database. Hence, communication with a remote location is required which exposes the system to hacking threats.

In prior art documents, US20140014715 refers to an apparatus for forming and reading an identification feature on or in an object. The apparatus comprises of a formation unit for physically forming an identification feature on or in an object, at least one reading unit adapted to read the identification feature to form a signature, and a housing, wherein the formation unit and the at least one reading unit are both contained in the housing. The at least one reading unit can comprise of at least two reading elements. The identification feature can comprise of an identification feature based on inherent disorder. The invention also refers to a method of forming and reading an identification feature on or in an object. But this technology utilizes physical properties associated with the PUF, such as capacitance, conductance, magnetic strength etc. of a disordered arrangement of particles whose sizes are either in micrometer or nanometer range, which requires a special proprietary device for verification of authenticity.

In prior art documents, U.S. Pat. No. 7,878,398 discloses use of randomly-occurring features of a label (whether embedded or naturally inherent) to provide counterfeit-resistant and/or tamper-resistant labels. More specifically, labels including randomly-occurring features are scanned to determine the labels' features. The information from the scan is utilized to provide identifying indicia which uniquely identifies each label and may be later verified against the label features that are present to determine whether the label is genuine. In a described implementation, the identifying indicia may be cryptographically signed. But, this technology requires the two ends of the fiber as coordinates to generate the random pattern. Hence, to read the pattern, fine alignment of the scanning equipment with respect to the label is required, necessitating a need for special scanner which would not be available at the point of sale retail customer.

Chong et. al (C. N. Chong, D. Jiang, J. Zhang, L. Guo, "Anti-counterfeiting with a Random Pattern", IEEE Second International Conference on Emerging Security Information, Systems and Technologies, 2008. pp. 146-153.) discloses the use of sprinkled phosphors as PUF and then store the hash value in database which eventually the user also accesses. But, this requires a communication network. Also, the phosphor based PUF will require special lighting source for illuminating and taking the image.

However, the existing marks are either costly, easy to replicate, not robust or require specialized readers or communication with a remote location. Thus, there exists a dire need for a proprietary PUF, 3D random pattern based mark for authenticating products and/or packages and thus preventing counterfeiting. It is required to develop a mark which is quick to manufacture, handy, cost-effective, provides reliable performances in the field, and does not require specialized readers or communication with remote location for authentication. Moreover, the said mark cannot be readily copied, duplicated or reverse-engineered.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Accordingly, embodiments provide an authenticating mark/label for preventing counterfeiting of products or packages.

Some embodiments provide a mark/label comprising 3D random patterns of physically unclonable function.

Some embodiments provide a mark/label based on cracks, colors, and other similar elements to form a cost effective and environment friendly PUF.

Some embodiments provide a mark/label based on paints and nail-polishes with crackle effect, layered paints, which had spontaneously evolved or engineered into a 3 D pattern, and other similar elements to form a cost effective PUF.

Some embodiments provide a mark/label based on above mentioned PUFs with additional phosphor particles.

Some embodiments include a system and a method for authenticating products or packages by using authenticating mark of 3D PUF as stated above.

Some embodiments provide a system and method for authentication of products and/or packages by comparison of the 3D PUF as stated above with another image without the use of specialized readers or communication in remote location.

According to an aspect of the present invention there is provided an authenticating mark/label formed on the surface of a product or package, said mark comprising: at least an overt portion of 3D visible random physical features, said features comprising physically unclonable function (PUF) pattern; characterized in that the said PUF patterns are 3D random patterns with tactile depth for quick verification of authentic product or package.

According to an aspect of the present invention there is provided an authenticating mark/label formed on the surface of a product or package, said mark comprising: at least an overt portion of 3D visible random physical features, said features consisting of physically unclonable function (PUF) pattern; characterized in that the said PUF patterns are 3D random patterns with tactile depth for quick verification of authentic product or package.

According to another aspect of the present invention there is provided a method of manufacturing a mark/label formed on the surface of a product or package as discussed above, said method comprising the steps of: applying/printing the PUF pattern on the product or package; acquiring in an image capturing means the image of the formed PUF pattern; generating, a digital signal of the formed PUF pattern; encrypting the generated digital signal of PUF pattern; and applying/printing the encrypted 2D image of PUF pattern on the same product or package.

According to another aspect of the present invention there is provided a method for authenticating product or package having a mark/label formed on the surface of a product or package according to various embodiment, said method comprising the steps of: acquiring, through a user equipment, images of the PUF pattern and printed 2D image of PUF pattern on the surface of the product or package as a mark/label; and recognizing the authenticity of the product or package by comparing the acquired image of PUF pattern and printed 2D image applied to the product or package.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The patent or application file contains at least one drawing executed in color. Copies of this patent or patent application publication with color drawing(s) will be provided by the Office upon request and payment of the necessary fee.

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

The present invention relates to authenticating mark for preventing counterfeiting of products or packages by PUF 3D random features. It provides an authenticating mark that constitutes a monolithically integrated pattern of 3D visible random physical features called physically unclonable function (PUF). The physically unclonable function images are 3D random, which may be formed by paints, clay, nail polish etc. The pattern generated has tactile depth feature and hence the end buyer may detect whether it is produced by the described method or simply it is a 2-D image produced by a counterfeiter. Further, the mark generated by the said PUF patterns may be further secured by adding multi-colors or color changing particles like phosphors particles to provide additional security. The mark has proprietary PUF, a 3-D random pattern, which is inexpensive and is difficult to reproduce due to 3-D nature.

Normally, in films, the attempt is to find ways to avoid cracks and uniformly apply paints/coatings. In embodiments of the present invention, this formation of cracks or patterns of paints are used as an opportunity for making PUF 3D random for anti-counterfeiting strategy. Embodiments of the present invention form cracks by use of clay particles, nail polish and water based, or other commercially available, paints for colors. Thus, providing an inexpensive and environmentally friendly authenticating mark.

In an embodiment, the PUF 3D random pattern may be produced using Crack pattern generation technique. In this, crack pattern is generated by coating films made up from a suspension of particles on various types of packaging surfaces. The particles are suspended in a binder/adhesive and acrylic paint and coated on to package label by means of drop casting, spray coating, screen or stencil printing and other such methods. Preferably, the clay may be bentonite or a powder of similar particle sizes In an embodiment, the PUF pattern may be made as above with multiple colors sprayed on it to provide additional security.

In an embodiment, the PUF 3D random pattern may be produced using two layers of paints which naturally develop a tactile 3D pattern upon drying. In some cases, acetone or similar solvent may be dropped on the layered paints in order to obtain the 3-D patterns. The paints may be spray coated, spin coated or drop casted or printed using other techniques. Preferably, the paints may be of brands like araldite, final touch, dotcom.

In an embodiment, the PUF 3D random pattern may be produced using single coating of paints and nail-polishes that show crackle effect. The paints may be spray coated, spin coated or drop casted or printed using other techniques. Preferably, the paints or nail-polishes may be of brands like Mikro Crackle Paint, Konad Crackle Nail Polish.

Figure 1:
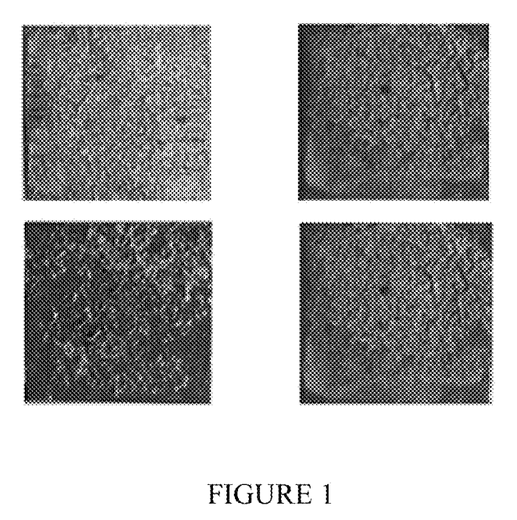
FIG. 1 illustrates the PUF 3D random pattern obtained by using araldite spray paint coatings, in accordance with the subject matter of the present invention.

Referring now to FIG. 1, which illustrates the patterns in the coating layers to obtain PUF 3D pattern on PET substrate. The layers in sequence are: Acetone (Spray Coated/Drop Casted); 'Araldite' Spray paint (Red Colored, Spray Coated); Asian Paint Premium Gloss Enamel (Black Colored, Spin Coated); and PET Substrate.

Figure 2:
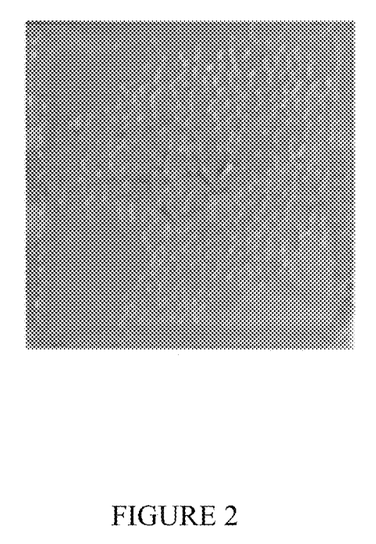
FIG. 2 illustrates the PUF 3D random pattern obtained by using final touch spray paint coatings, in accordance with the subject matter of the present invention.

Referring now to FIG. 2, which illustrates the PUF 3D pattern on PET substrate. The layers in sequence are: Acetone (Drop Casted); 'Final Touch' Spray Paint (Grey Colored, Spray Coated); Asian Paint Premium Gloss Enamel (Black Colored, Spin Coated); and PET Substrate.

Figure 3:
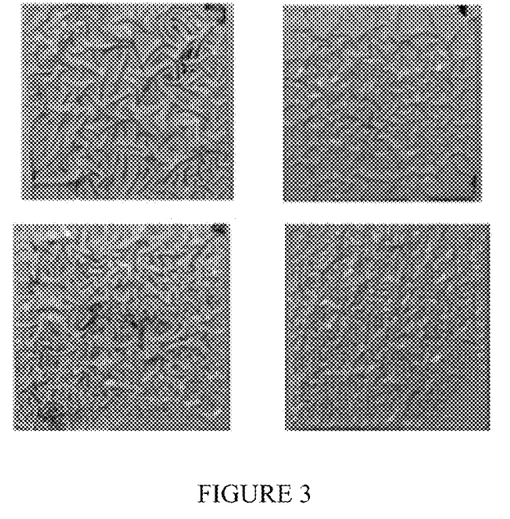
FIG. 3 illustrates the PUF 3D random pattern obtained by using DOTCOM spray paint coatings, in accordance with the subject matter of the present invention.

Referring now to FIG. 3, which illustrates the layered structure of the textured PUF 3D pattern generated on PET substrate by paints. The layers in sequence are: DOTCOM' Spray Paint (Grey Colored, Spray Coated); Asian Paint Premium Gloss Enamel (Black Colored, Spin Coated); and PET Substrate. No acetone is needed.

Figure 4:
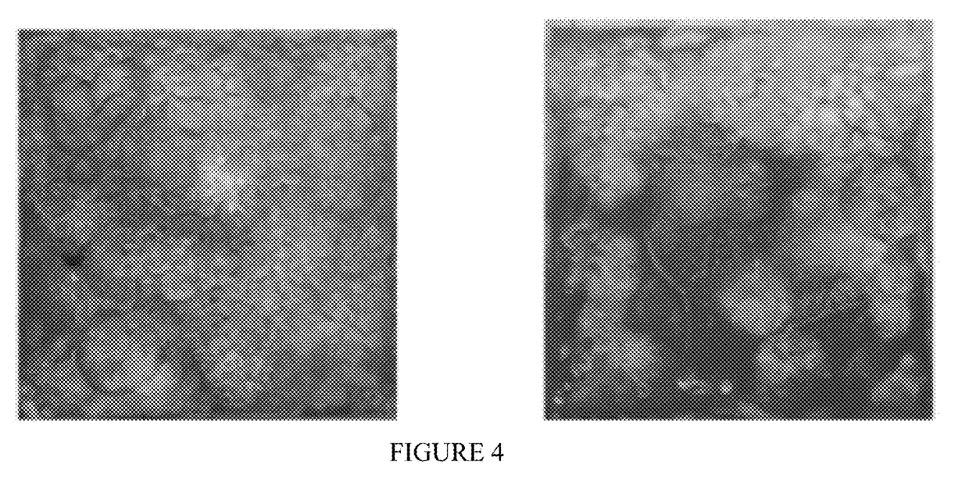
FIG. 4 illustrates the PUF 3D random pattern obtained by using araldite spray paint coatings, in accordance with the subject matter of the present invention.

Referring now to FIG. 4, which illustrates the layered structure of PUF 3D pattern. The layers in sequence are: Acetone (Drop Casted); 'Araldite' Spray paint (Red Colored, Spray Coated); Acrylic Paint (Yellow Colored, Spin Coated); and PET Substrate.

In an embodiment, the PUF 3D random pattern may be produced using a dispersion of clay particles in a solution of water-based paint, adhesive and Water. The water-based paint used may be any acrylic paint from 'Fevicryl' brand. The preferred adhesive or binder used is of 'Fevicol' brand.

Figure 5:
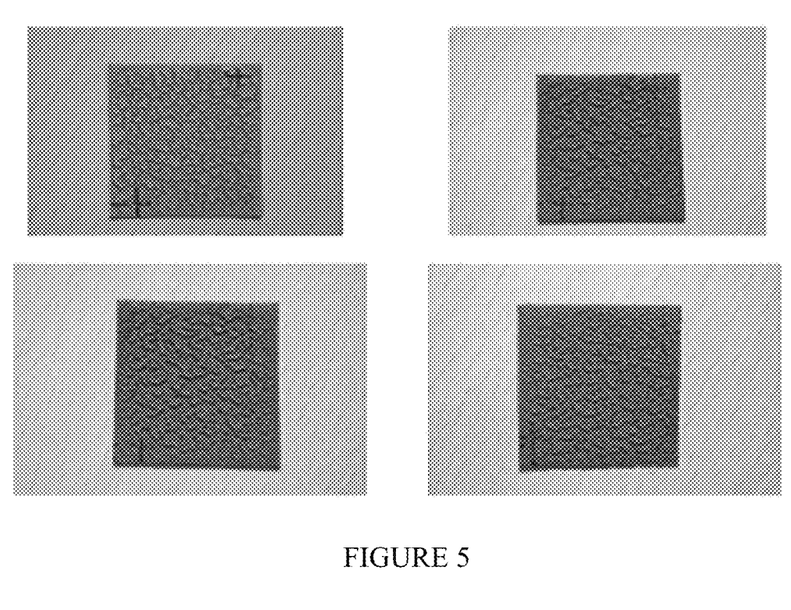
FIG. 5 illustrates the PUF 3D random pattern obtained by drop casting dispersion of clay particles in water, an acrylic paint of any color and adhesive for coatings, in accordance with the subject matter of the present invention.

Referring now to FIG. 5, which illustrates the crack based PUF 3D pattern generated on PET substrate by dispersion of clay particles in paint, adhesive and water. The layers in sequence are: dried colloidal layer (applied by Drop Casting of Colloidal Dispersion); and PET Substrate. The pattern is confined by using a mask to obtain sharp edges, hence, defining the origin for the pattern analysis.

In an embodiment, the PUF 3D random pattern may be produced using crackle paints or nail polish. The crackle paint or nail polish may be applied by brush on a substrate, be spray coated, spin coated or drop casted or printed using other techniques.

Figure 6:
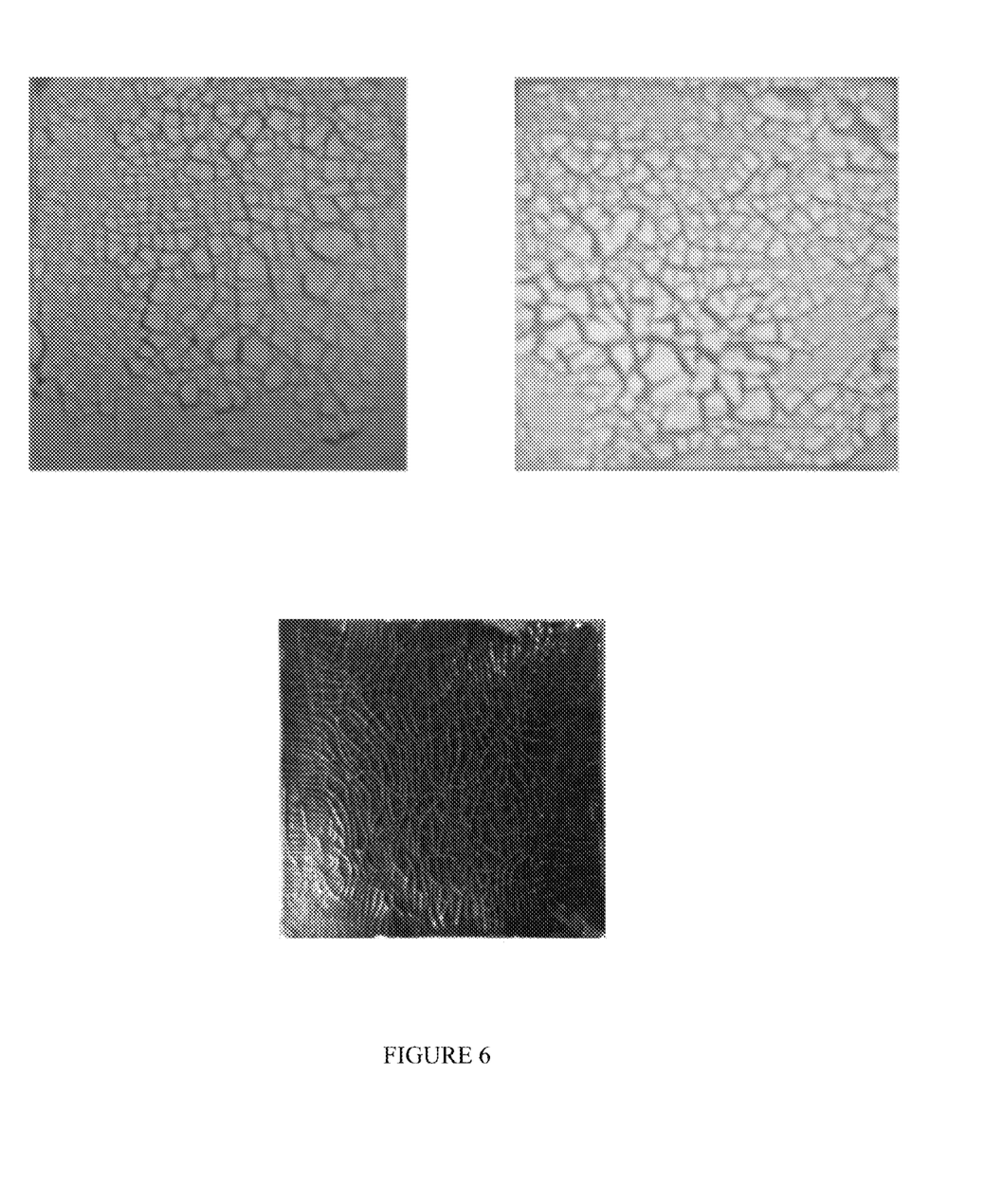
FIG. 6 illustrates the PUF 3D random pattern obtained by crackle nail polish (top row) and crackle paint (bottom row), in accordance with the subject matter of the present invention.

Referring now to FIG. 6, it illustrates 3D PUF using paints and nail-polish which show crackle effect. Preferably, the paints or nail-polishes may be of brands like Mikro Crackle Paint, Konad Crackle Nail Polish.

Figure 7:
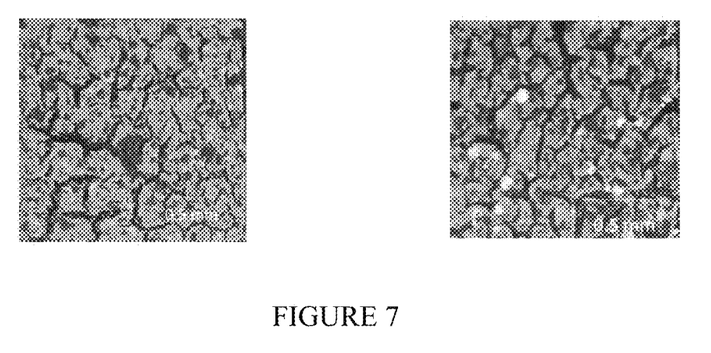
FIG. 7 illustrates the PUF 3D random pattern obtained by stencil printed mixture of clay particles in water, an acrylic paint and adhesive with additional three colors sprayed on the cracked pattern, in accordance with the subject matter of the present invention.

In an embodiment, the PUF 3D random patterns may be further made secure by use of multiple colors. This feature further reduces the chances of counterfeiting of generated PUF 3D image by molding. This may be done by two methods. Firstly, by printing two or more paints together so that they leave a multicolor pattern along with the cracks, which then cannot be copied even by molding. Secondly, by adding large number of colors. This may be done by adding a large number of colors after generating the 3-D pattern. (FIG. 7)

The advantage of this added security measures is that it may prevent counterfeiting by 3-D printing and thus enhance security. Further, it may not be possible to print such a large number of colors by 3-D printers for counterfeiting.

In an embodiment, the PUF 3D random patterns may further comprise of colour changing particles like fluorescent or luminescent particles, preferably phosphor particles. Introduction of IR Phosphor particles to each of the above overt-featured pattern types, incorporate a covert feature that may be visible only on shining camera flash on the tag. An IR Fluorescent Powder is purchased from MaxMax. The emission wavelength of this phosphor lies in the Near-IR region. The results of Photoluminescence (PL) and Photoluminescence excitation (PLE) spectra measurements conducted on this IR Phosphor Powder are as follows:

| Excitation Wavelength (nm) | Emission Wavelength (nm) |
|---|---|
| 384, 398 (Violet) | 436 (Violet) |
| 494 (Blue) | 988 (Near-IR) |
| 358 (Near-UV) | 1074 (Near-IR) |
| 630 (Red) | 946 (Near-IR) |

Some embodiments further relate to a system and a method for authenticating product. The system comprises an authenticating mark, which comprises of two monolithically integrated images, one of which is a physically unclonable function 3D random pattern. This physically unclonable function 3D random pattern is captured and converted into a 2D signal. This 2D signal may be obtained using standard image processing techniques such as image enhancement using log filters, edge and ridge detection using first and second order signal filters, homography using perspective relation.

Figure 8:
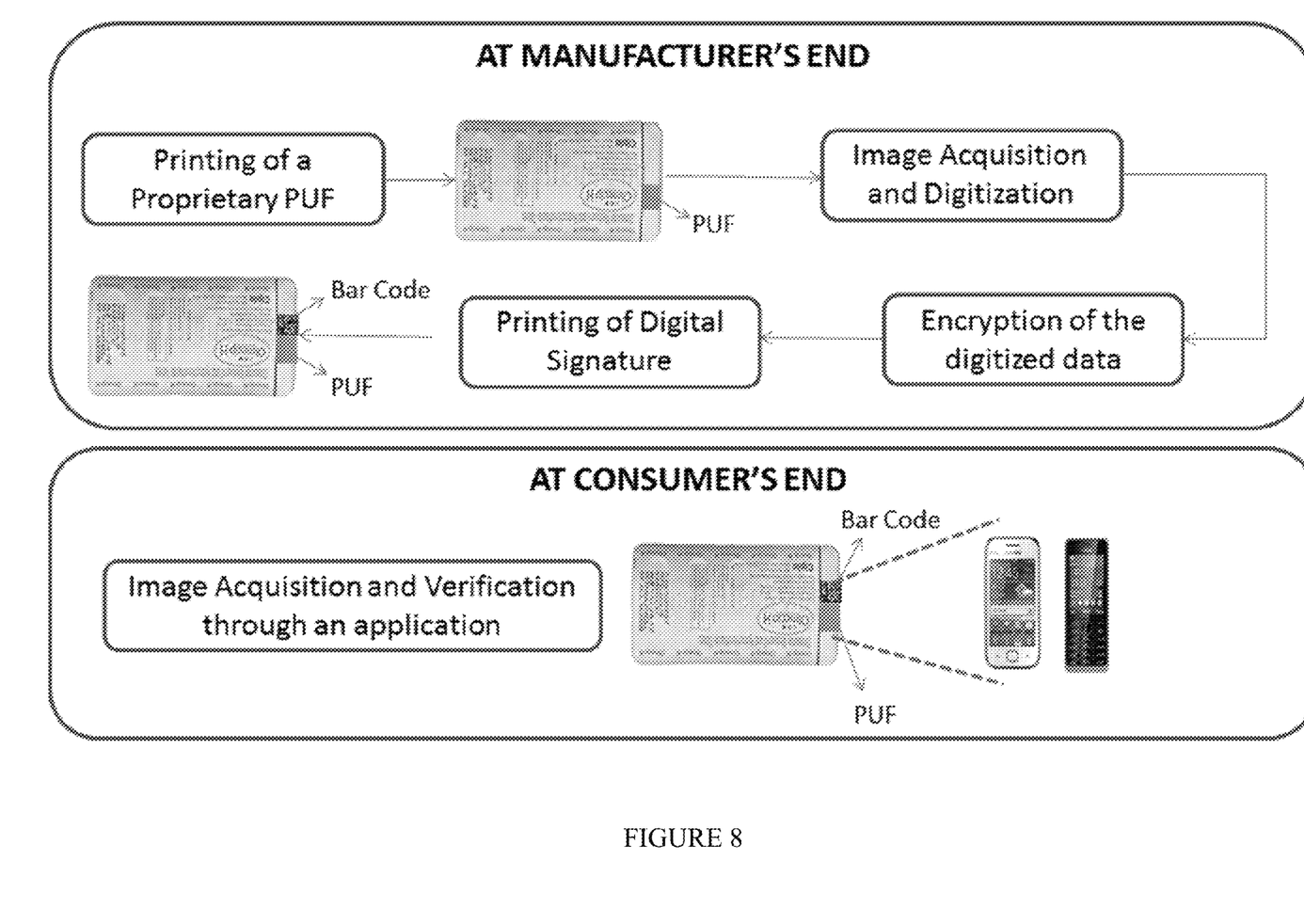
FIG. 8 illustrates the process of integrating the authenticating mark on the product at the manufacturer's end and then authentication at the user end, in accordance with the subject matter of the present invention.

This signal may be digitally signed using different hashing algorithms like SHA-2. If computed, digital signature is also encrypted along with the 2D signal using cryptography algorithms such as RSA/public-private key encryption etc. The 2D signal can also be directly encrypted without using digital signature. Finally the encrypted data may be reposted on the package in the form of a 2D image, such as a QR code. The approach is illustrated in FIG. 8. These two images i.e. the generated 3D random pattern and the 2D image may be compared by any means to authenticate the product and prevent counterfeiting. This comparison is performed through an App downloadable on user hand held device with camera. In this, no communication to any remote location whatsoever is required, but it can be added for additional security.

One embodiment of a system comprises means for capturing and comparing the images. Such means can be but not limited to a mobile phone and its camera and can be any other user equipment capable of capturing images and comparing the same. It would be understood by a person skilled in the art that the captured images can be compared using an application program preloaded in the mobile phone or the user equipment.

In an embodiment, the authenticating mark has two monolithically integrated images. The said image includes firstly a physically visible pattern that is a proprietary PUF. This pattern is amenable to image capture by a macro-lens. The captured image is then digitized and encrypted. The encrypted image forms the second components of the integrated image. This is printed as a 2-d image, which is readable and comparable by any means to establish the authenticity of the product.

In an embodiment of the present invention, the 2 D image may be a simple bar code.

In an embodiment, the authenticating mark may be produced at a very low cost per tag.

In an embodiment, the method to authenticate the object/product does not require communication with a remote location or an additional specialized detection device.

In an embodiment of the present invention, the image capture of the PUF pattern and comparison of the two images may be performed with the aid of an electronic device. This may include a handheld, portable, image capture device having a built-in imaging module of the type universally found in consumer electronic digital cameras. The device may be a cellular telephone or smartphone that has a built-in imaging module. It may be understood that other mobile electronic devices, such as personal digital assistants (PDAs), tablets, computers, e-readers, media players, or like electronic devices having such modules, especially those normally readily at hand to average users may be used.

Embodiments can provide an advantage by providing a low cost random image based on using cracks, two-layered paints and crackle paints and nail-polishes. The random images provide a rich level of detail, in terms of sizes and density, which is tunable, unlike other simple methods. The random patterns that are 3-D features makes it difficult to copy the image. According to one embodiment, the user may also be advised to sense by touch or sight the 3-D features at the time of verification. Embodiments are amenable for additional complexity at not much added costs, for example by including more colors or color changing particles (phosphors)/media etc. Embodiments of the present invention can provide additional security by encryption.

Indian Patent Application 201611015765 (Indian Patent Publication No. 45/2017), entitled Anti-Counterfeiting Mark with 3-D Features," published Nov. 10, 2017, is hereby fully incorporated herein by reference for all purposes.

We claim:

1. An authenticating mark formed on a surface of a product or package, said authenticating mark comprising:
    at least an overt portion of 3D visible random physical features, said 3D visible random physical features comprising a physically unclonable function (PUF) pattern, wherein the said PUF pattern is a 3D random pattern with tactile depth for quick verification of the product or package as authentic.

2. The authenticating mark as claimed in claim 1, wherein the PUF pattern is generated using crackle effect produced from crackle paints and crackle nail polishes.

3. The authenticating mark as claimed in claim 1, wherein the PUF pattern is generated by layered paints or low boiling solvents.

4. The authenticating mark as claimed in claim 1, wherein the PUF pattern is generated by one or more combinations of clay particles, water, paint or adhesive.

5. The authenticating mark as claimed in claim 1, wherein the PUF pattern further comprises a plurality of colors to provide additional security.

6. The authenticating mark as claimed in claim 1, wherein the PUF pattern further comprises luminescent or fluorescent phosphor particles to provide additional security.

7. The authenticating mark as claimed in claim 1, wherein the PUF pattern is monolithically integrated on the product or package.

8. The authenticating mark as claimed in claim 1, wherein the PUF pattern is encapsulated in a transparent, non-glossy material.

9. The authenticating mark as claimed in claim 1, wherein said authenticating mark further comprises a 2D printed image generated from encrypted data of a 2D digital signal of the PUF pattern.

10. The authenticating mark of claim 9, wherein the 2D printed image is a 2D matrix code.

11. The authenticating mark of claim 9, wherein the 2D printed image is a QR code.

12. The authenticating mark of claim 9, wherein the 2D printed image is a 2D barcode.

13. The authenticating mark of claim 1, wherein the 3D random pattern with tactile depth comprises a random pattern of cracks or a random pattern of undulations.

14. A method of manufacturing a mark comprising:
    applying/printing on a surface of a product or package, an overt portion of 3D visible random physical features, said 3D visible random physical features comprising a physically unclonable function (PUF) pattern, the PUF pattern comprising a 3D random pattern with tactile depth;
    acquiring an image of the PUF pattern;
    generating a digital signal of the PUF pattern;
    encrypting the generated digital signal of the PUF pattern to generate encrypted data; and
    applying the encrypted data as an encrypted 2D image of the PUF pattern on the same product or package.

15. The method as claimed in claim 14, wherein the PUF pattern is printed by spray coating, ink-jet printing, stencil printing, or screen-printing.

16. The method as claimed in claim 14, wherein the encrypted 2D image of PUF pattern is printed by screen printing, stencil printing, inkjet printing, or laser printing.

17. The method of manufacturing of claim 14, wherein the 3D random pattern with tactile depth comprises a random pattern of cracks or a random pattern of undulations.

18. A method comprising:
    acquiring, through a user equipment, an image of a physically unclonable function (PUF) pattern and a printed 2D image of the PUF pattern, the PUF pattern and 2D image of the PUF pattern disposed on a surface of a product or package as a mark, the PUF pattern comprising a 3D random pattern with tactile depth; and
    recognizing the authenticity of the product or package by comparing the acquired image of PUF pattern and printed 2D image applied to the product or package.

19. The method as claimed in claim 18, wherein said user equipment for image capturing is an electronic device adapted to convert the PUF pattern to 2D data and compare the 2D data with the 2D image of the PUF pattern, wherein the 2D image of the PUF pattern is an encrypted 2D image of the PUF pattern.

20. The method of claim 18 wherein the 3D random pattern with tactile depth comprises a random pattern of cracks or a random pattern of undulations.

* * * * *